United States Patent
Wang

(10) Patent No.: US 11,258,097 B2
(45) Date of Patent: Feb. 22, 2022

(54) ELECTROLYTE AND LITHIUM-ION BATTERY CONTAINING THE SAME

(71) Applicant: NINGDE AMPEREX TECHNOLOGY LIMITED, Ningde (CN)

(72) Inventor: Kefei Wang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 47 days.

(21) Appl. No.: 15/999,754

(22) Filed: Aug. 20, 2018

(65) Prior Publication Data

US 2019/0013549 A1  Jan. 10, 2019

Related U.S. Application Data

(63) Continuation of application No. 15/605,110, filed on May 25, 2017, now Pat. No. 10,833,365.

(30) Foreign Application Priority Data

May 25, 2016 (CN) .......................... 201610352232.2

(51) Int. Cl.
| | |
|---|---|
| *H01M 10/0567* | (2010.01) |
| *H01M 10/0525* | (2010.01) |
| H01M 10/052 | (2010.01) |
| H01M 10/0566 | (2010.01) |
| H01M 10/0564 | (2010.01) |

(52) U.S. Cl.
CPC ... *H01M 10/0567* (2013.01); *H01M 10/0525* (2013.01); *H01M 10/052* (2013.01); *H01M 10/0564* (2013.01); *H01M 10/0566* (2013.01); *H01M 2300/0025* (2013.01)

(58) Field of Classification Search
CPC ........... H01M 10/052; H01M 10/0525; H01M 10/0567; H01M 2300/0025; H01M 10/0564; H01M 10/0566

USPC .......................................................... 429/199
See application file for complete search history.

(56) References Cited

U.S. PATENT DOCUMENTS

| | | | |
|---|---|---|---|
| 5,037,713 A | 8/1991 | Yoshino et al. | |
| 2003/0209685 A1 | 11/2003 | Robin et al. | |
| 2005/0014072 A1 | 1/2005 | Yamaguchi et al. | |
| 2009/0029193 A1* | 1/2009 | Onnerud | H01M 2/345 |
| | | | 429/7 |
| 2011/0008680 A1* | 1/2011 | Muldoon | C07C 307/02 |
| | | | 429/325 |
| 2013/0089778 A1 | 4/2013 | Ihara et al. | |
| 2014/0248543 A1* | 9/2014 | Zhu | H01M 4/139 |
| | | | 429/338 |
| 2018/0342758 A1* | 11/2018 | Tang | H01M 50/409 |

FOREIGN PATENT DOCUMENTS

| | | |
|---|---|---|
| CN | 101359750 A | 2/2009 |
| CN | 105355968 A | 2/2016 |
| CN | 105355970 A | 2/2016 |

OTHER PUBLICATIONS

Chinese Office Action CN201610352232.2, dated Nov. 29, 2017, 16 pgs.
Wang, Office Action, U.S. Appl. No. 15/605,110, dated Nov. 19, 2018, 14 pgs.
Wang, Final Office Action, U.S. Appl. No. 15/605,110, dated May 24, 2019, 15 pgs.

* cited by examiner

*Primary Examiner* — Jonathan G Jelsma
*Assistant Examiner* — Omar M Kekia
(74) *Attorney, Agent, or Firm* — Morgan, Lewis & Bockius LLP

(57) ABSTRACT

The present application relates to the technical field of lithium-ion batteries and, specifically, relates to an electrolyte and a lithium-ion battery containing the electrolyte. The electrolyte of the present application includes a lithium salt, an organic solvent and additives, the additives include a fluorinated ether compound and an ester dimer compound, the ester dimer compound includes carbonate dimers, carboxylate dimers and sultone dimers.

6 Claims, No Drawings

ELECTROLYTE AND LITHIUM-ION BATTERY CONTAINING THE SAME

CROSS-REFERENCE TO RELATED APPLICATIONS

The present application is a continuation of U.S. patent application Ser. No. 15/605,110, entitled "ELECTROLYTE AND LITHIUM-ION BATTERY CONTAINING THE SAME", filed May 25, 2017, which claims priority to Chinese Patent Application No. 201610352232.2, entitled "ELECTROLYTE AND LITHIUM-ION BATTERY CONTAINING THE SAME", filed on May 25, 2016, all of which are hereby incorporated by reference in their entirety.

TECHNICAL FIELD

The present application relates to the technical field of lithium-ion batteries and, specifically, relates to an electrolyte and a lithium-ion battery containing the electrolyte.

BACKGROUND

In recent years, with the development of intelligent electronic products, there is an increasingly higher demand on battery life of the lithium-ion battery. In order to increase the energy density of the lithium-ion battery, an effective manner is to develop high-voltage lithium-ion batteries.

At present, the lithium-ion battery with a working voltage is ≥4.4V has become a research hotspot for various R&D institutions and companies. However, when at high voltage, the positive electrode material will have improved oxidation activity and reduced stability, resulting in that the electrochemical oxidizing reaction of the non-aqueous electrolyte will readily occur on the surface of the positive electrode, and thus the electrolyte will decompose and generate gas. At the same time, reduction reaction will occur to the transition metal elements in the positive electrode material, such as nickel, cobalt, manganese and so on, and thus such transition metal elements will precipitate out, which will cause further deterioration of electrochemical performance of the lithium-ion battery. A primary solution at present is to add into the electrolyte a film forming additive which can form a film at the positive electrode, which, however, will increase interface impedance, and thus reduce transport and diffusion kinetic performance of lithium ions in the battery and therefore cause deterioration of rate and cycle performance of the battery. Chainlike carbonate dimers, chainlike carboxylate dimers, chainlike sulfonate dimers or phosphate esters can improve high-temperature storage performance, initial charge/discharge performance, safety and cycle performance, etc., however, it is difficult for these materials to wet the electrode plate and separator as a result of too large viscosities thereof, which therefore, especially under high compact density, causes disadvantageous effects to the cycle performance, rate performance and low-temperature performance of the cell.

With respect to the defects of the prior art, the present application is proposed.

SUMMARY

A primary invention object of the present application is to provide an electrolyte.

A secondary invention object of the present application is to provide a lithium-ion cell containing the electrolyte.

In order to accomplish the objects of the present application, the adopted technical solutions include:

The present application relates to an electrolyte, including a lithium salt, an organic solvent and additives, characterized in that, the additives comprise additive A and additive B, wherein the additive A is selected from the group consisting of carbonate dimers, carboxylate dimers and combinations thereof, and the additive B is selected from the group consisting of fluoroethers and combinations thereof.

Preferably, a structural formula of the carbonate dimer is shown as Formula I:

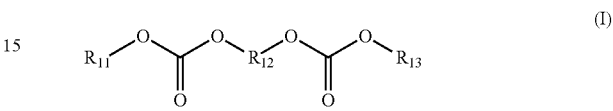

in Formula I, $R_{11}$ and $R_{13}$ are respectively selected from the group consisting of substituted or unsubstituted $C_{1\sim12}$ alkyls, substituted or unsubstituted $C_{2\sim12}$ alkenyls, substituted or unsubstituted $C_{2\sim12}$ alkynyls, substituted or unsubstituted $C_{6\sim26}$ aryls and substituted or unsubstituted $C_{5\sim22}$ heteroaryls, wherein each substituting group is selected from the group consisting of halogens, $C_{6\sim26}$ aryls and $C_{3\sim8}$ cyclic alkyls;

$R_{12}$ is selected from the group consisting of substituted or unsubstituted $C_{1\sim12}$ alkylenes, substituted or unsubstituted $C_{6\sim26}$ arylenes and radical groups composed of at least one ether bond and at least one substituted or unsubstituted $C_{1\sim12}$ alkylene, wherein each substituting group is selected from the group consisting of halogens.

Preferably, a structural formula of the carboxylate dimer is shown as Formula II:

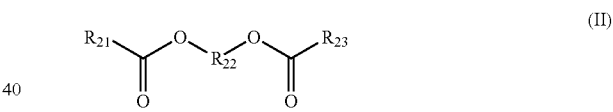

in Formula II, $R_{21}$ and $R_{23}$ are respectively selected from the group consisting of substituted or unsubstituted $C_{1\sim12}$ alkyls, substituted or unsubstituted $C_{2\sim12}$ alkenyls, substituted or unsubstituted $C_{2\sim12}$ alkynyls, substituted or unsubstituted $C_{6\sim26}$ aryls and substituted or unsubstituted $C_{5\sim22}$ heteroaryls, wherein each substituting group is selected from the group consisting of halogens, $C_{6\sim26}$ aryls and $C_{3\sim8}$ cyclic alkyls;

$R_{22}$ is selected from the group consisting of substituted or unsubstituted $C_{1\sim12}$ alkylenes, substituted or unsubstituted $C_{6\sim26}$ arylenes and radical groups composed of at least one ether bond and at least one substituted or unsubstituted $C_{1\sim12}$ alkylene, wherein each substituting group is selected from the group consisting of halogens.

Preferably, a structural formula of the sultone dimer is shown as Formula III:

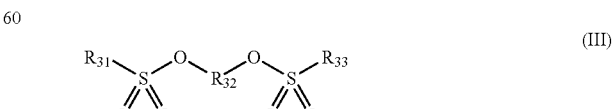

in Formula III, $R_{31}$ and $R_{33}$ are respectively selected from the group consisting of substituted or unsubstituted $C_{1\sim12}$ alkyls, substituted or unsubstituted $C_{2\sim12}$ alkenyls, substituted or unsubstituted $C_{2\sim12}$ alkynyls, substituted or unsubstituted $C_{6\sim26}$ aryls and substituted or unsubstituted $C_{5\sim22}$ heteroaryls, wherein each substituting group is selected from the group consisting of halogens, $C_{6\sim26}$ aryls and $C_{3\sim8}$ cyclic alkyls;

$R_{32}$ is selected from the group consisting of substituted or unsubstituted $C_{1\sim12}$ alkylenes, substituted or unsubstituted $C_{6\sim26}$ arylenes and radical groups composed of at least one ether bond and at least one substituted or unsubstituted $C_{1\sim12}$ alkylene, wherein each substituting group is selected from the group consisting of halogens.

Preferably, a structural formula of the fluoroether compound is shown as Formula IV:

$$R_{41}\text{—}O\text{—}R_{42} \quad (IV)$$

in Formula IV, $R_{41}$ and $R_{42}$ are respectively selected from the group consisting of $C_{1\sim20}$ alkyls and $C_{1\sim20}$ fluoroalkyls; at least one of $R_{41}$ and $R_{42}$ is a $C_{1\sim20}$ fluoroalkyl; and the fluoroalkyl is an alkyl of which all or partial hydrogen atoms are substituted by a fluorine;

$R_{41}$ and $R_{42}$ are preferably selected from the group consisting of $C_{1\sim9}$ alkyls and $C_{1\sim9}$ fluoroalkyls, respectively.

Preferably, the fluoroether compound is selected from the group consisting of $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$ and combinations thereof.

Preferably, a total content of the additive A and the additive B is 0.001%~30% by weight of the electrolyte.

Preferably, the additives further include additive C selected from the group consisting of nitrile compounds, cyclic ester compounds containing a sulfur-oxygen double bond, cyclic carbonate compounds, compounds containing a carbon-nitrogen double bond and combinations thereof;

the nitrile compound is selected from the group consisting of alkanes containing 1~5 nitrile groupings, olefins containing 1~5 nitrile groupings and combinations thereof;

the cyclic ester compound containing a sulfur-oxygen double bond is selected from the group consisting of cyclic sulfates, cyclic sulfites, sultones and combinations thereof;

the compound containing a carbon-nitrogen double bond is selected from the group consisting of compounds containing

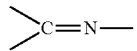

and —N=C=N— and combinations thereof.

Preferably, the nitrile compound is selected from the group consisting of $C_{2\sim12}$ alkanes containing 1~4 nitrile groupings, $C_{2\sim12}$ olefins containing 1~4 nitrile groupings and combinations thereof;

the cyclic ester compound containing a sulfur-oxygen double bond is selected from the group consisting of compounds shown as Formula V1, compounds shown as Formula V2, compounds shown as Formula V3 and combinations thereof; the cyclic carbonate compound is selected from compounds shown as Formula V4 and combinations thereof;

$R_{51}$, $R_{52}$, $R_{53}$ and $R_{54}$ are respectively selected from the group consisting of substituted or unsubstituted $C_{1\sim4}$ alkylenes and substituted or unsubstituted $C_{2\sim4}$ alkenylenes, wherein each substituting group is selected from the group consisting of halogens and $C_{2\sim4}$ alkenyls.

Preferably, the additive C is selected from the group consisting of acetonitrile, propionitrile, butyronitrile, valeronitrile, butenenitrile, 2-methyl-3-butenenitrile, malononitrile, succinonitrile, glutaronitrile, hexanedinitrile, fumarodinitrile, 1,2-ethylene sulfate, 1,3-propylene sulfate, 1,3-propylene sulfite, 1,3-propane sultone, 1,4-butane sultone, prop-1-ene-1,3-sultone, vinylene carbonate, fluoroethylene carbonate, fluorovinylene carbonate, 1,2-difluorovinylene carbonate, vinyl ethylene carbonate, dicyclohexylcarbodiimide and combinations thereof;

a content of the additive C is preferably 0.01%~10% by weight of the electrolyte.

The present application further relates to a lithium-ion battery including a positive electrode plate containing a positive electrode active material, a negative electrode plate containing a negative electrode active material, a separator for lithium battery and the electrolyte according to the present application.

The technical solutions of the present application can have at least the following beneficial effects:

In the present application, the fluoroethers contained in the electrolyte firstly play a role of surfactants which prompt the wetting of the ester dimers on the electrode plate and separator, so as to compensate for the insufficient wetting ability of the ester dimers as a result of large viscosities thereof. Strong hydrogen bonding interaction readily occurs between a plurality of O=X (X is carbon or sulfur) radical groups of the ester dimers and the fluoroether, which helps the fluoroether form a stable and compact protection film. Due to strong electron pulling effect of the fluorine atom of the fluoroether, the ester dimer will also readily form a film on the negative electrode surface. As a function of the hydrogen bonding interaction between the O=X radical groups in the ester dimer and the fluoroether, the protection film is stable at high temperature or high voltage and will not decompose during cycling. The lithium battery of the present application can realize the object of high voltage, of which the highest normal working voltage can be improved to 4.4~5.0V, and the lithium battery has good cycle performance, higher capacity retention rate at charge/discharge and improved service life.

The present application is further explained in connection with the following embodiments. It is appreciated that these embodiments are merely used to illustrate the present application but not to limit the scope of the present application.

DESCRIPTION OF EMBODIMENTS

The present application proposes an electrolyte, including a lithium salt, an organic solvent and additives, characterized in that, the additives include additive A and additive B, wherein the additive A is selected from the group consisting of carbonate dimers, carboxylate dimers, sultone dimers and combinations thereof, and the additive B is selected from the group consisting of fluoroethers and combinations thereof.

As an improvement to the electrolyte of the present application, the additive A includes a carbonate dimer and/or a carboxylate dimer and a sultone dimer.

As an improvement to the electrolyte of the present application, a structure of the carbonate dimer is shown as Formula I:

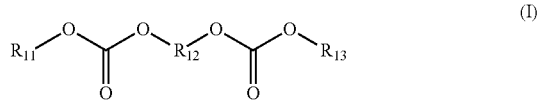

in Formula I, $R_{11}$ and $R_{13}$ are respectively selected from the group consisting of substituted or unsubstituted $C_{1\sim12}$ alkyls, substituted or unsubstituted $C_{2\sim12}$ alkenyls, substituted or unsubstituted $C_{2\sim12}$ alkynyls, substituted or unsubstituted $C_{6\sim26}$ aryls and substituted or unsubstituted $C_{5\sim22}$ heteroaryls, wherein each substituting group is selected from the group consisting of halogens, $C_{6\sim26}$ aryls and $C_{3\sim8}$ cyclic alkyls, $R_{12}$ is selected from the group consisting of substituted or unsubstituted $C_{1\sim12}$ alkylenes, substituted or unsubstituted $C_{6\sim26}$ arylenes and radical groups composed of at least one ether bond and at least one substituted or unsubstituted $C_{1\sim12}$ alkylene, wherein each substituting group is selected from the group consisting of halogens.

As an improvement to the electrolyte of the present application, $R_{11}$ and $R_{13}$ are respectively selected from the group consisting of $C_{1\sim6}$ alkyls; and $R_{12}$ is selected from the group consisting of $C_{1\sim6}$ alkylenes.

As an improvement to the electrolyte of the present application, partial examples of the carbonate dimer are as follows:

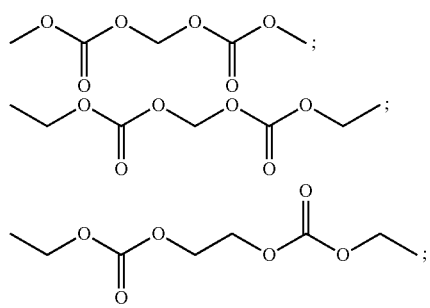

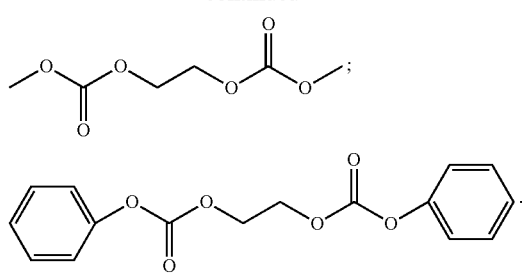

As an improvement to the electrolyte of the present application, a structure of the carboxylate dimer is shown as Formula II:

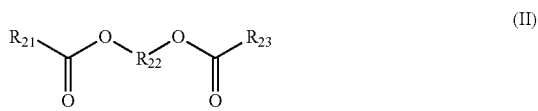

in Formula II, $R_{21}$ and $R_{23}$ are respectively selected from the group consisting of substituted or unsubstituted $C_{1\sim12}$ alkyls, substituted or unsubstituted $C_{2\sim12}$ alkenyls, substituted or unsubstituted $C_{2\sim12}$ alkynyls, substituted or unsubstituted $C_{6\sim26}$ aryls and substituted or unsubstituted $C_{5\sim22}$ heteroaryls, wherein each substituting group is selected from the group consisting of halogens, $C_{6\sim26}$ aryls and $C_{3\sim8}$ cyclic alkyls;

$R_{22}$ is selected from the group consisting of substituted or unsubstituted $C_{1\sim12}$ alkylenes, substituted or unsubstituted $C_{6\sim26}$ arylenes and radical groups composed of at least one ether bond and at least one substituted or unsubstituted $C_{1\sim12}$ alkylene, wherein each substituting group is selected from the group consisting of halogens.

As an improvement to the electrolyte of the present application, $R_{21}$ and $R_{23}$ are respectively selected from the group consisting of $C_{1\sim6}$ alkyls; $R_{22}$ is selected from the group consisting of $C_{1\sim12}$ alkylenes and divalent radical groups obtained by connecting a ether bond with two $C_{1\sim6}$ alkylenes.

As an improvement to the electrolyte of the present application, partial examples of the carboxylate dimer are as follows:

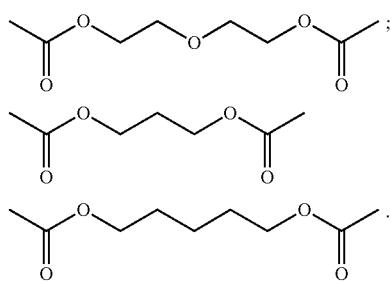

As an improvement to the electrolyte of the present application, a structure of the sultone dimer is shown as Formula III:

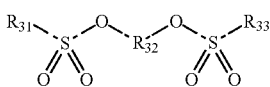

in Formula III, $R_{31}$ and $R_{33}$ are respectively selected from the group consisting of substituted or unsubstituted $C_{1\sim12}$ alkyls, substituted or unsubstituted $C_{2\sim12}$ alkenyls, substituted or unsubstituted $C_{2\sim12}$ alkynyls, substituted or unsubstituted $C_{6\sim26}$ aryls and substituted or unsubstituted $C_{5\sim22}$ heteroaryls, wherein each substituting group is selected from the group consisting of halogens, $C_{6\sim26}$ aryls and $C_{3\sim8}$ cyclic alkyls;

$R_{32}$ is selected from the group consisting of substituted or unsubstituted $C_{1\sim12}$ alkylenes, substituted or unsubstituted $C_{6\sim26}$ arylenes and radical groups composed of at least one ether bond and at least one substituted or unsubstituted $C_{1\sim12}$ alkylene, wherein each substituting group is selected from the group consisting of halogens.

As an improvement to the electrolyte of the present application, $R_{31}$ and $R_{33}$ are respectively selected from the group consisting of $C_{1\sim6}$ alkyls; and $R_{32}$ is selected from the group consisting of $C_{1\sim6}$ alkylenes.

As an improvement to the electrolyte of the present application, partial examples of the sultone dimer are as follows:

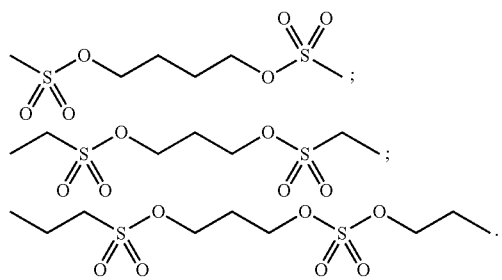

As an improvement to the electrolyte of the present application, a structure of the fluoroether compound is shown as Formula IV:

in Formula IV, $R_{41}$ and $R_{42}$ are respectively selected from the group consisting of $C_{1\sim20}$ alkyls and $C_{1\sim20}$ fluoroalkyls; at least one of $R_{41}$ and $R_{42}$ is a $C_{1\sim20}$ fluoroalkyl; and the fluoroalkyl is an alkyl of which all or partial hydrogen atoms are substituted by fluorine;

As an improvement to the electrolyte of the present application, $R_{41}$ and $R_{42}$ are respectively selected from the group consisting of $C_{1\sim9}$ alkyls and $C_{1\sim9}$ fluoroalkyls.

As an improvement to the electrolyte of the present application, the fluoroether compound is selected from the group consisting of $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$ and combinations thereof.

As an improvement to the electrolyte of the present application, the fluoroether compound is selected from the group consisting of $F(CF_2)_3OCH_3$, $H(CF_2)_2CH_2O(CF_2)_2H$ and $CF_3CHFCF_2CH_2OCHF_2$.

As an improvement to the electrolyte of the present application, a total content of the additive A and the additive B is 0.001%~30% by weight of the electrolyte. It is found upon researches that, when the content of the composite additives in the electrolyte is less than 0.001%, the electrolyte cannot effectively form a stable passive film, such that the low-temperature performance and rate performance of the lithium-ion battery cannot be basically improved; when the content of the composite additives in the electrolyte is more than 30%, a relatively thick film is formed, which therefore increases the impedance and reduces the cycle performance of the lithium-ion battery.

As an improvement to the electrolyte of the present application, the total content of the additive A and the additive B is 1~20% by weight of the electrolyte. The content ratio of the ester dimer compound and the fluoroether compound in the composite additives is not limited.

In the present application, the ester dimer can be obtained by a conventional synthetic method, for example the method disclosed in CN200810107928, or commercially purchased; the fluoroether can be commercially available and its original source is not limited.

As an improvement to the electrolyte of the present application, the additives further include additive C selected from the group consisting of nitrile compounds, cyclic ester compounds containing a sulfur-oxygen double bond, cyclic carbonate compounds, compounds containing a carbon-nitrogen double bond and combinations thereof. When the additives include the additive C, the cycle performance of the lithium-ion battery can be further improved, for example, the lithium-ion battery can have relatively high capacity retention rate after a plurality of cycles at a high voltage ≥4.45V. Moreover, the rate performance and the discharge performance of the battery at low temperature can also be further improved.

As an improvement to the electrolyte of the present application, a content of the additive C is 0.01%~10% by weight of the electrolyte.

In the above-mentioned additive C, the number of the nitrile grouping in the nitrile compound may be 1, 2, 3, 4 or 5; and the nitrile compound is an alkane containing 1~5 nitrile groupings or an olefin containing 1~5 nitrile groupings, preferably a $C_{2\sim12}$ alkane containing 1~4 nitrile groupings or a $C_{2\sim12}$ olefin containing 1~4 nitrile groupings.

The nitrile compound is: a mononitrile compound if it contains only one nitrile grouping, a dinitrile compound if it contains two nitrile groupings, a trinitrile compound if it contains three nitrile groupings, or a tetranitrile compound if it contains four nitrile groupings. In addition, the nitrile compound may further contain a carbon-carbon double bond. Preferably, the nitrile compound is selected from the group consisting of mononitrile compounds, dinitrile compounds, trinitrile compounds, tetranitrile compounds and combinations thereof.

Examples of the nitrile compound may include mononitrile compounds such as acetonitrile, propionitrile, butyronitrile, isobutyronitrile, valeronitrile, isovaleronitrile, 2-methyl butanenitrile, trimethylacetonitrile, hexanenitrile, cyclopentanecarbonitrile, cyclohexanecarbonitrile, acrylonitrile, methacrylonitrile, butenenitrile, 2-methyl-3-butenenitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropanenitrile, 3-fluoropropanenitrile, 2,2-difluoropropanenitrile, 2,3-difluoropropanenitrile, 3,3-difluoropropanenitrile, 2,2,3-trifluoropropionitrile, 3,3,3-trifluoropropionitrile and pentafluoropropionitrile; dinitrile compounds such as malononitrile, succinonitrile, tetramethyl-succinonitrile, glutaronitrile, 2-methylglutaronitrile, hexanedinitrile, fumarodinitrile and 2-methyleneglutaronitrile; trinitrile compounds such as 1,3,5-pentanetricarbonitrile, 1,2,3-propanetricarbonitrile and 1,3,6-hexanetricarbonitrile; and tetranitrile compounds such as tetracyanoethylene.

Preferably, the nitrile compound is selected from the group consisting of acetonitrile, propionitrile, butyronitrile, valeronitrile, butenenitrile, 2-methyl-3-butenenitrile, acrylonitrile, succinonitrile, glutaronitrile, hexanedinitrile (abbreviated as ADN), fumarodinitrile and combinations thereof; more preferably, the nitrile compound is selected from the group consisting of acrylonitrile, succinonitrile, glutaronitrile, hexanedinitrile, fumarodinitrile, 1,3,6-hexanetricarbonitrile and combinations thereof.

Preferably, a content of the nitrile compound is 0.01~5% by weight of the electrolyte, more preferably 0.1~3%.

In the abovementioned additive C, the cyclic ester compound containing a sulfur-oxygen double bond may be selected from the group consisting of cyclic sulfates, cyclic sulfites, sultones and combinations thereof, wherein the sultones include saturated sultones and sultones containing an unsaturated double bond.

The cyclic sulfate compounds are shown as Formula V1, the cyclic sulfite compounds are shown as V3, and the sultone compounds are shown as V2:

(V1)

$$\underset{O}{\overset{R_{51}}{\underset{\|}{\overset{O}{\underset{O}{\overset{O}{\text{S}}}}}}}\overset{O}{\underset{O}{\text{;}}}$$

(V2)

$$R_{52}-\overset{O}{\underset{O}{\overset{\|}{\text{S}}}}\overset{O}{\underset{O}{\text{;}}}$$

(V3)

$$\underset{O}{\overset{R_{53}}{\underset{\|}{\overset{O}{\underset{O}{\text{S}}}}}}\overset{O}{\text{;}}$$

$R_{51}$, $R_{52}$ and $R_{53}$ are respectively selected from the group consisting of substituted or unsubstituted $C_{1-4}$ alkylenes and substituted or unsubstituted $C_{2-4}$ alkenylenes, wherein each substituting group is selected from the group consisting of halogens.

Preferably, $R_{51}$ and $R_{53}$ are respectively selected from the group consisting of substituted or unsubstituted $C_{1-4}$ alkylenes; $R_{52}$ is selected from the group consisting of substituted or unsubstituted $C_{1-4}$ alkylenes and substituted or unsubstituted $C_{2-4}$ alkenylenes.

Preferably, the cyclic ester compound containing a sulfur-oxygen double bond is selected from the group consisting of the following compounds and combinations thereof:

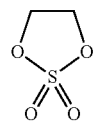

ethylene sulfate;

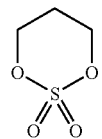

1,3-propylene sulfate;

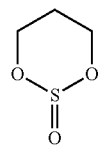

1,3-propylene sulfite;

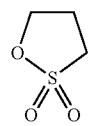

1,3-propanesultone (abbreviated as PS);

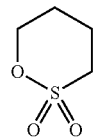

1,4-butane sultone;

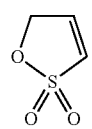

prop-1-ene-1,3-sultone.

Preferably, a content of the cyclic ester compound containing a sulfur-oxygen double bond is 0.01~5% by weight of the electrolyte, more preferably 0.1~3%.

The cyclic ester compound containing a sulfur-oxygen double bond may be otherwise selected from the group consisting of the following compounds:

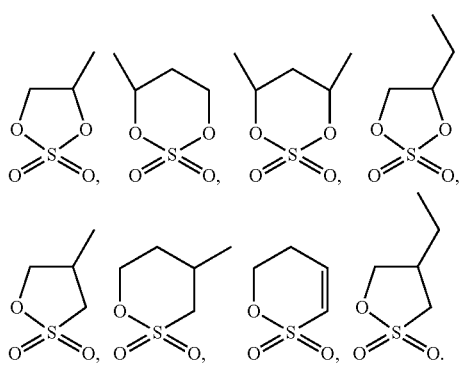

The cyclic carbonate compound includes saturated cyclic carbonates and cyclic carbonates containing an unsaturated carbon-carbon bond, of which the structural formula is shown as Formula V4:

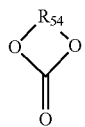

(V4)

$R_{54}$ is selected from the group consisting of substituted or unsubstituted $C_{1~4}$ alkylenes and substituted or unsubstituted $C_{2~4}$ alkenylenes, wherein each substituting group is selected from the group consisting of halogens and $C_{2~4}$ alkenyls.

In the cyclic carbonate compound containing an unsaturated carbon-carbon bond, the unsaturated carbon-carbon bond is preferably a double bond which may be or may not be located on the ring thereof.

In the abovementioned electrolyte, the cyclic carbonate compound is preferably selected from the group consisting of the following compounds and combinations thereof:

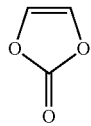

Vinylene carbonate (abbreviated as VC),

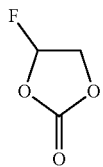

fluoroethylene carbonate;

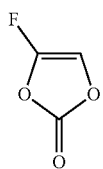

fluorovinylene carbonate;

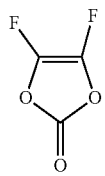

1,2-difluorovinylene carbonate;

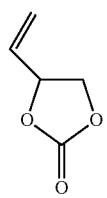

vinyl ethylene carbonate.

Preferably, a content of the cyclic carbonate compound is 0.01~5% by weight of the electrolyte, more preferably 0.1-3%.

The cyclic carbonate compound may be otherwise selected from the group consisting of the following compounds and combinations thereof:

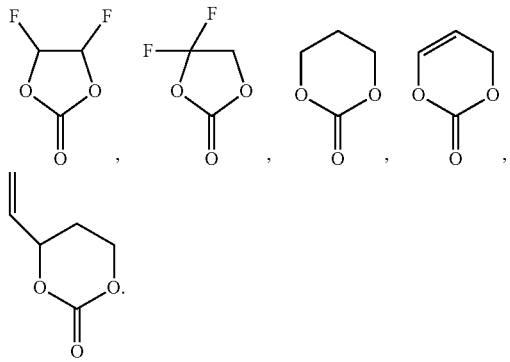

In the abovementioned additive C, the compound containing a carbon-carbon double bond is selected from the group consisting of compounds containing an imido-group, compounds containing a carbodiimide group and combinations thereof, wherein the imido-group is shown as $$\diagup C = N —$$

and the carbodiimide group is shown as —N=C=N—;
the compound containing a carbon-nitrogen double bond is shown as Formula VIa; and the compound containing a carbodiimide group is shown as Formula VIb;

$$\begin{matrix} R_{61} \\ R_{62} \end{matrix} C = N — R_{63};$$

(VIa)

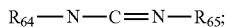
(VIb)

$R_{61}$, $R_{62}$, $R_{63}$, $R_{64}$ and $R_{65}$ are respectively selected from the group consisting of substituted or unsubstituted $C_{1\sim12}$ alkyls and substituted or unsubstituted $C_{2\sim12}$ alkenyls, wherein each substituting group is selected from the group consisting of halogens.

Examples of the compound containing a carbon-nitrogen double bond can include:

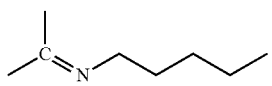

N-pentyl-isopropyl-imide (abbreviated as NPPI),

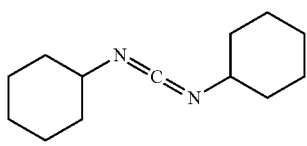 [SMILES: C(=NC1CCCCC1)=NC1CCCCC1]

dicyclohexylcarbodiimide (abbreviated as DCC).

Preferably, a content of the compound containing a carbon-nitrogen double bond is 0.01~5% by weight of the electrolyte, more preferably 0.1~3%.

In the above-mentioned structural formulas of the present application:

The $C_{1\sim12}$ alkyl may be a chainlike alkyl or a cyclic alkyl, and a hydrogen on the ring of the cyclic alkyl can be substituted by an alkyl. A straight or branched alkyl is preferred. The lower limit value of the number of carbon atoms in the $C_{1\sim12}$ alkyl is preferably 2, 3, 4 or 5, and the upper limit value of the number of carbon atoms in the $C_{1\sim12}$ alkyl is preferably 3, 4, 5, 6, 8, 9, 10 or 11. It is preferred to select a $C_{1\sim10}$ alkyl, more preferably a $C_{1\sim6}$ chainlike alkyl or a $C_{3\sim8}$ cyclic alkyl, further more preferably a $C_{1\sim4}$ chainlike alkyl or a $C_{5\sim7}$ cyclic alkyl. Examples of the alkyl may include: methyl, ethyl, n-propyl, iso-propyl, n-butyl, iso-butyl, sec-butyl, tert-butyl, n-pentyl, iso-pentyl, neopentyl, hexyl, 2-methylpentyl, 3-methylpentyl, 1,1,2-trimethylpropyl, 3,3-dimethylbutyl, heptyl, 2-heptyl, 3-heptyl, 2-methylhexyl, 3-methylhexyl, iso-heptyl, octyl, nonyl and decyl.

The $C_{2\sim12}$ alkenyl may be a cyclic alkenyl or a chainlike alkenyl, preferably a straight or branched alkenyl. Further, the alkenyl preferably has only one double bond. A lower limit value of the number of carbon atoms in the alkenyl is preferably 3, 4 or 5, and an upper limit value of the number of carbon atoms in the alkenyl is preferably 6, 8, 10 or 11. It is preferred to select a $C_{2\sim10}$ alkenyl, more preferably a $C_{2\sim6}$ alkenyl, further more preferably a $C_{2\sim5}$ alkenyl. Examples of the alkenyl may include: vinyl, propenyl, isopropenyl, pentenyl, cyclohexenyl, cycloheptenyl and cyclo-octenyl. As for the alkynyle, it can be selected by referring to the selections of the alkenyl.

The $C_{1\sim12}$ alkylene is a straight or branched alkylene, of which a lower limit value of the number of carbon atoms is preferably 1, 2, 3 or 4, and an upper limit value of the number of carbon atoms is preferably 6, 7, 8, 9, 10 or 11. Examples of the alkylene may include: methylene, 1,2-ethylidene, 1,3-propylidene, 2-methyl-1,3-propylidene, 1,3-dimethyl-propylidene, 1-methyl-1,2-ethylidene, 1,1-dimethylethylidene, 1,2-dimethylethylidene, 1,4-butylidene, 1,5-pentylidene, 1,6-hexylidene, 1,1,4,4-tetramethylbutylidene, cyclopropylidene, 1,2-cyclopropylidene, 1,3-cyclobutylidene, cyclobutylidene, cyclohexylidene, 1,4-cyclohexylidene, 1,4-cycloheptylidene, cycloheptylidene, 1,5-cyclo-octamethylene and cyclo-octamethylene.

The $C_{2\sim12}$ alkenylene is a straight or branched alkenylene, of which the number and position of the double bond are not limited, which can be selected according to actual demands. In particular, the number of the double bond may be 1, 2, 3 or 4. In the alkenylene, a lower limit value of the number of carbon atoms is preferably 2, 3, 4 or 5, and an upper limit value of the number of carbon atoms is preferably 6, 8, 10 or 11. Examples of the alkenylene may include: 1,2-vinylene, vinylidene, 1,3-propenylene, 2-propenylene, methyl-1,2-vinylene, ethyl-1,2-vinylene, 1,4-tetraniethylene-2-alkenyl, 1,5-pentamethylene-2-alkenyl, 1,6-hexamethylene-3-alkenyl, 1,7-heptamethylene-3-alkenyl and 1,8-octamethylene-2-alkenyl.

The $C_{6\sim26}$ aryl could be, for example a phenyl, a phenylalkyl, a aryl containing at least one phenyl such as biphenyl and polycyclic aromatic group such as naphthyl, anthryl and phenanthryl, and a hydrogen of the biphenyl and the polycyclic aromatic group can be substituted by an alkyl or an alkenyl. It is preferred to select a $C_{6\sim16}$ aryl, more preferably a $C_{6\sim14}$ aryl, and further more preferably a $C_{6\sim9}$ aryl. Examples of the aryl may include: phenyl, benzyl, biphenyl, p-tolyl, o-tolyl and m-tolyl.

The C5-22 heteroaryl may include: furyl, thienyl, pyrryl, thiazolyl, imidazolyl, pyridyl, pyrazinyl, pyrimidinyl, pyridazinyl, indolyl and quinolyl.

The halogen is selected from the group consisting of fluorine, chlorine and bromine, and is preferably selected from the group consisting of fluorine and chlorine.

As an improvement of the electrolyte of the present application, the organic solvent is particularly a non-aqueous organic solvent, preferably selected from the group consisting of compounds having 1~8 carbon atoms and at least one ester group.

Preferably, the organic solvent is selected from the group consisting of ethylene carbonate, propylene carbonate, butylene carbonate, fluoroethylene carbonate, dimethyl carbonate, diethyl carbonate, dipropyl carbonate, ethyl methyl carbonate, methyl propyl carbonate, ethyl propyl carbonate, 1,4-butyrolactone, methyl propionate, methyl butyrate, ethyl acetate, ethyl propionate, ethyl butyrate and combinations thereof. However, the solvent is not limited to the above-mentioned specific compounds, and the solvent may be otherwise selected from fluoro-compounds of the above-mentioned compounds.

In the abovementioned electrolyte, the lithium salt is elected from a group consisting of organic lithium salts, inorganic lithium salts and combinations thereof. Particularly, the lithium salt contains at least one element of fluorine, boron and phosphorus.

Examples of the lithium salt may include: lithium hexafluorophosphate $LiPF_6$, lithium difluorophosphate $LiPO_2F_2$, lithium tetrafluoroborate $LiBF_4$, lithium bis(trifluoromethanesulphonyl)imide $LiN(CF_3SO_2)_2$ (abbreviated as LiTFSI), lithium bis(fluorosulfonyl)imide $Li(N(SO_2F)_2)$ (abbreviated as LiFSI), lithium bis(oxalate)borate $LiB(C_2O_4)_2$ (abbreviated as LiBOB), lithium oxalyldifluoroborate $LiBF_2(C_2O_4)$ (abbreviated as LiDFOB).

In the abovementioned electrolyte, the lithium salt is preferably selected from the group consisting of lithium hexafluorophosphate, lithium difluorophosphate, lithium tetrafluoroborate, lithium hexafluoroarsenate, lithium perchlorate, lithium trifluorosulfonate, lithium bis(trifluoromethylsulfonyl) imide, lithium bis(fluorosulfonyl) imide, lithium tris(trifluoromethylsulfonyl) methide and combinations thereof.

Particularly, the concentration of the lithium salt can be 0.5 mol/L~3 mol/L.

In the present application, the electrolyte can be prepared by a conventional manner, for example, to evenly mix all the materials in the electrolyte.

Another object of the present application is to provide a lithium-ion battery, including a positive electrode plate, a negative electrode plate, a separator for lithium battery and the electrolyte of the present application.

In the abovementioned lithium-ion battery, the positive electrode plate includes a positive electrode active material; the negative electrode plate includes a negative electrode active material; and the specific types of the positive electrode active material and the negative electrode active material are not limited, which can be selected according to actual demands.

Preferably, the positive electrode active material is selected from the group consisting of lithium cobaltate ($LiCoO_2$), lithium nickel-manganese-cobalt oxide, lithium ferrous phosphate ($LiFePO_4$), lithium manganate ($LiMn_2O_4$) and combinations thereof.

Preferably, the negative electrode active material is carbon and/or silicon, for example, natural graphite, artificial graphite, mesocarbon microbeads (abbreviated as MCMB), hard carbon, soft carbon, silicon, silicon-carbon composites, Li—Sn alloy, Li—Sn—O alloy, Sn, SnO, $SnO_2$, lithiated $TiO_2$—$Li_4Ti_5O_{12}$ with a spinel structure and Li—Al alloy are all suitable as the negative electrode active material.

The present application is further described in connection with the following embodiments. It should be noted that, these embodiments are merely exemplary, which do not constitute any limit to the protection scope of the present application.

In the following embodiments, comparative examples and test examples, all used reagents, materials and instruments could be commercially available unless otherwise noted, and the used reagents can also be obtained by conventional manners.

Embodiments 1~15

In the following embodiments, comparative examples and test examples, the used materials are listed as follows Organic solvent: ethylene carbonate (EC), propylene carbonate (PC), diethyl carbonate (DEC); Lithium salt: $LiPF_6$;

Additive A: ester dimers;

Carbonate dimer: 2-ethoxycarbonyloxyethyl ethyl carbonate (AN1);

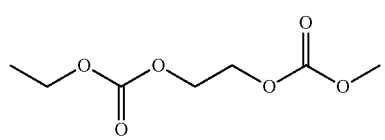

Carboxylate dimer: diethylene glycol diacetate (AN2);

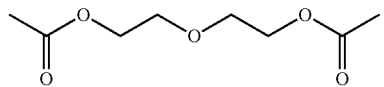

Sultone dimer: 4-methansulfonyloxy-butyl methanesulfonate (AN3)

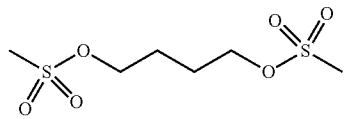

Additive B: fluoroether:
$F(CF_2)_3OCH_3$ (AM1);
$CF_3CHFCF_2CH_2OCHF_2$ (AM2);
$H(CF_2)_2CH_2O(CF_2)_2H$ (AM3);
Additive C:
fluoroethylene carbonate (FEC);
vinylene carbonate (VC);
1,3-propanesultone (PS);
hexanedinitrile (ADN);

Separator for lithium battery: polypropylene separator membrane with a thickness of 16 μm (Model: A273, provided by Celgard Corporation).

Lithium batteries (hereinafter referred to as batteries) 1~15 are all prepared according to the following manner:

(1) Preparation of Positive Electrode Plate

Lithium cobaltate ($LiCoO_2$), a binder (polyvinylidene fluoride) and a conductive agent (acetylene black) are mixed in a weight ratio of $LiCoO_2$:polyvinylidene fluoride:acetylene black=96:2:2, then added with N-methylpyrrolidone (NMP) and stirred by a vacuum mixer to form a uniform and transparent state, so as to obtain a positive electrode slurry; the positive electrode slurry is then evenly coated onto an aluminum foil with a thickness of 12 μm, dried at room temperature and then dried in an oven at 120° C. for 1 hour, then cold-pressed and slit, so as to obtain a positive electrode plate.

(2) Preparation of Negative Electrode Plate

Graphite, acetylene black, sodium carboxymethylcellulose (CMC) thickener and styrene-butadiene rubber binder are mixed in a weight ratio of graphite:acetylene black:styrene-butadiene rubber binder:sodium carboxymethylcellulose thickener=95:2:2:1, then added with deionized water and stirred by a vacuum mixer, so as to form a negative electrode slurry; the negative electrode slurry is then evenly coated onto a copper foil, dried at room temperature and then dried in an oven at 120° C. for 1 hour, then cold-pressed and slit, so as to obtain a negative electrode plate.

(3) Preparation of Electrolyte

Electrolytes 1~15 are prepared according to the following manner:

In a glove box filled with argon atmosphere with a moisture content <10 ppm, EC, PC and DEC are evenly mixed in a weight ratio of 1:1:1 so as to form an organic solvent; the lithium salt which has been fully dried is then dissolved into the abovementioned organic solvent; the additive A (AN1, AN2, AN3, AM1, AM2, AM3) and additive B (FEC, VC, PS, ADN, EDN) are then added into the organic solvent according to the content shown in Table 1 and evenly mixed, so as to obtain an electrolyte, of which the concentration of the lithium salt is 1 mol/L, and the weight ratio of EC, PC and DEC is EC:PC:DEC=1:1:2.

(4) Preparation of Lithium-Ion Battery

The positive electrode plate, separator for lithium battery and negative electrode plate are stacked in sequence and then winded to form a bare cell, such that the separator can insulate the positive electrode plate from the negative electrode plate; the bare cell is then packaged into an external packaging foil, then injected with the prepared electrolyte, vacuum sealed, let standby, formed and shaped, so as to obtain a battery.

During the preparation of the abovementioned batteries, the selected electrolyte in each battery and the specific type and contents of the used additive A and additive B in each electrolyte are shown in Table 2.

In Table 1, the content of the additive is a weight percentage counted based on the total weight of the electrolyte.

a constant current of 0.5 C to 3.0V, then repeat the charge and discharge as above and respectively calculate the capacity retention rates after 50 cycles, 100 cycles and 300 cycles.

Capacity retention rate after n cycles=(discharge capacity after the $n^{th}$ cycle/discharge capacity after the first cycle)× 100%. Relevant data is shown in Table 2.

(2) Test for High-Temperature Storage Performance of Battery

The following test is conducted to each of the batteries obtained in Embodiments 1~15 and Comparative examples 1~8:

At 25° C., a battery is charged with a constant current of 0.5 C to 4.45V, charged with a constant voltage of 4.45V to a current of 0.025 C and let to be in a fully charged state when the measured thickness is the thickness before storage; then, the battery is respectively stored at 85° C. for 4 hours and 60° C. for 30 days, the thicknesses of the battery after storage are respectively measured, and the thickness expansion rate of the battery after storage at different conditions are calculated in the following formula. The thicknesses of the batteries after storage at different conditions are shown in Table 2.

Thickness expansion rate of battery=[(thickness before storage−thickness after storage)/thickness before storage]×100%

TABLE 1

Relevant parameters of additives of electrolytes in Comparative examples 1~8 and Embodiments 1~15

| | Content (%) of additive in electrolyte | | | | | | | | | |
|---|---|---|---|---|---|---|---|---|---|---|
| | Additive A | | | Additive B | | | Additive C | | | |
| | AN1 | AN2 | AN3 | AM1 | AM2 | AM3 | PS | VC | ADN | FEC |
| Embodiment 1 | 0.01 | — | — | — | 0.1 | — | — | — | — | — |
| Embodiment 2 | 1 | — | — | 2 | — | — | — | — | — | — |
| Embodiment 3 | 1 | — | — | — | 2 | — | 2 | 1 | — | — |
| Embodiment 4 | 1 | — | — | — | — | 2 | 2 | 1 | — | — |
| Embodiment 5 | 5 | — | — | — | 10 | — | 2 | 1 | — | — |
| Embodiment 6 | 8 | — | — | — | — | 2 | 2 | 1 | — | — |
| Embodiment 7 | — | 5 | — | — | — | 10 | 2 | 1 | — | — |
| Embodiment 8 | — | 5 | — | — | — | 10 | 2 | 1 | 1 | 1 |
| Embodiment 9 | 10 | — | — | — | — | 10 | 2 | 1 | 1 | 1 |
| Embodiment 10 | — | — | 15 | — | — | 15 | 3 | 1 | 1 | 1 |
| Embodiment 11 | — | — | 20 | — | — | 15 | 3 | 2 | 2 | 1 |
| Embodiment 12 | 5 | — | 5 | — | — | 2 | — | — | — | — |
| Embodiment 13 | 5 | — | 5 | — | — | 2 | 2 | 1 | — | — |
| Embodiment 14 | — | 5 | 5 | — | — | 2 | — | — | — | — |
| Embodiment 15 | — | 5 | 5 | — | — | 2 | 2 | 1 | — | — |
| Comparative example 1 | — | — | — | — | — | — | — | — | — | — |
| Comparative example 2 | — | — | — | — | — | — | 2 | 1 | — | — |
| Comparative example 3 | — | — | — | — | — | 2 | 2 | 1 | — | — |
| Comparative example 4 | — | — | 2 | — | — | — | 2 | 1 | — | — |
| Comparative example 5 | 2 | — | — | — | — | — | — | — | — | — |
| Comparative example 6 | — | — | — | — | — | 2 | — | — | — | — |
| Comparative example 7 | 0.01 | — | — | — | — | — | — | — | — | — |
| Comparative example 8 | 20 | — | — | 20 | — | — | — | — | — | — |

Performance Test Manners:

(1) Test for Cycle Performance of Battery

At 45° C., the lithium-ion batteries of Embodiments 1-15 and Comparative examples 1-8 are charged with a constant current at a rate of 0.5 C to 4.45V, then charged with a constant voltage to a current of 0.05 C, then discharged with

TABLE 2

Testing results of relevant performance of Embodiments 1~15 and Comparative examples 1~8

| | Cycle performance | | | Thickness expansion rate (%) | |
|---|---|---|---|---|---|
| | | | | After storage at | After storage at |
| | 50 cycles | 100 cycles | 300 cycles | 85° C. for 4 hours | 60° C. for 30 days |
| Embodiment 1 | 80.9 | 75.6 | 71.8 | 9.3 | 6.4 |
| Embodiment 2 | 86.9 | 83.5 | 82.5 | 9.7 | 12.1 |
| Embodiment 3 | 94.7 | 94.2 | 89.5 | 8.1 | 6.7 |
| Embodiment 4 | 89.7 | 89.2 | 84.5 | 6.7 | 7.9 |
| Embodiment 5 | 87.5 | 82.9 | 81.2 | 7.8 | 9.15 |
| Embodiment 6 | 93 | 90.1 | 85.9 | 5.6 | 7.3 |
| Embodiment 7 | 88.4 | 87.6 | 85.2 | 5.4 | 6.9 |
| Embodiment 8 | 96.3 | 94.9 | 91.7 | 4.3 | 6.2 |
| Embodiment 9 | 95.1 | 93.5 | 91.5 | 4.5 | 6.4 |
| Embodiment 10 | 93.5 | 91.3 | 88.8 | 3.8 | 6.1 |
| Embodiment 11 | 93.1 | 90.3 | 87.4 | 4.9 | 7.5 |
| Embodiment 12 | 96.7 | 95.2 | 93.2 | 3.2 | 4.6 |
| Embodiment 13 | 97.3 | 96.1 | 92.9 | 2.9 | 4.3 |
| Embodiment 14 | 97.1 | 95.9 | 93.6 | 2.9 | 4.7 |
| Embodiment 15 | 97.8 | 96.8 | 94.2 | 2.2 | 4.5 |
| Comparative example 1 | 45.1 | 39.4 | 35.2 | 32.8 | 39.1 |
| Comparative example 2 | 57.2 | 53.5 | 46.3 | 27.9 | 35.3 |
| Comparative example 3 | 59.5 | 54.8 | 48.7 | 25.3 | 31.2 |
| Comparative example 4 | 64.2 | 58.2 | 50 | 24.1 | 30.6 |
| Comparative example 5 | 67 | 59.65 | 49.4 | 18.5 | 26.7 |
| Comparative example 6 | 72 | 66.7 | 62.55 | 16.2 | 21.5 |
| Comparative example 7 | 46.1 | 40.2 | 36.1 | 30.3 | 38.5 |
| Comparative example 8 | 54.3 | 51.2 | 45.6 | 28.1 | 31.2 |

(3) Hot-Box Test

The following test is conducted to each of the batteries obtained in Embodiments 1~15 and Comparative examples 1~8:

1) charging the battery with a constant current of 1.0 C to 4.45V, then charging with a constant voltage until the current reduces to 0.05 C, and then stop charging.

2) placing the battery in a hot box, increasing the temperature from 25° C. to 150° C. at a heating rate of 5° C./min, maintaining the temperature at 150° C. and begin timing, 1 hour later, observing the state of the battery; the standard for passing the test includes no fuming, no fire and no explosion, and each group has 5 batteries. The result of hot-box test for each battery is shown in Table 4.

The safety performance of the battery is characterized by the above hot-box test.

TABLE 3

Testing results of relevant performance of Embodiments 1~15 and Comparative examples 1~8

| Battery No. | State after hot-box test |
|---|---|
| Embodiment 1 | All 5 batteries pass the test with no fume, no fire and no explosion |
| Embodiment 2 | 4 batteries pass the test and the other 1 battery is on fire. |
| Embodiment 3 | All 5 batteries pass the test with no fume, no fire and no explosion |
| Embodiment 4 | All 5 batteries pass the test with no fume, no fire and no explosion |
| Embodiment 5 | All 5 batteries pass the test with no fume, no fire and no explosion |
| Embodiment 6 | All 5 batteries pass the test with no fume, no fire and no explosion |
| Embodiment 7 | All 5 batteries pass the test with no fume, no fire and no explosion |
| Embodiment 8 | All 5 batteries pass the test with no fume, no fire and no explosion |
| Embodiment 9 | All 5 batteries pass the test with no fume, no fire and no explosion |
| Embodiment 10 | All 5 batteries pass the test with no fume, no fire and no explosion |
| Embodiment 11 | All 5 batteries pass the test with no fume, no fire and no explosion |
| Embodiment 12 | All 5 batteries pass the test with no fume, no fire and no explosion |
| Embodiment 13 | All 5 batteries pass the test with no fume, no fire and no explosion |
| Embodiment 14 | All 5 batteries pass the test with no fume, no fire and no explosion |
| Embodiment 15 | All 5 batteries pass the test with no fume, no fire and no explosion |
| Comparative example 1 | All 5 batteries are on fire |
| Comparative example 2 | All 5 batteries are on fire |
| Comparative example 3 | 1 battery passes the test and the other 4 batteries are on fire |

TABLE 3-continued

Testing results of relevant performance of Embodiments 1~15 and Comparative examples 1~8

| Battery No. | State after hot-box test |
|---|---|
| Comparative example 4 | 1 battery passes the test and the other 4 batteries are on fire |
| Comparative example 5 | 2 batteries pass the test and the other 3 batteries are on fire |
| Comparative example 6 | 2 batteries pass the test and the other 3 batteries are on fire |
| Comparative example 7 | 2 batteries pass the test and the other 3 batteries are on fire |
| Comparative example 8 | 2 batteries pass the test and the other 3 batteries are on fire |

It can be known from the relevant data in Tables 2~4 that, in Comparative examples 1~8, Comparative examples 3~6 containing only one of carbonate dimer and fluoroether of the additive A have reduced capacity retention rate and reduced rate performance due to relatively high impedance during the formation of the film. However, Embodiments 1~11 adopt the combination of ester dimer and fluoroether compound, which can reduce the thickness of the SEI film on the positive electrode surface and reduce the impedance, and improve uniformity and stability of the SEI film formed on the positive electrode surface, so as to improve the rate performance and low-temperature discharge performance of the lithium-ion battery. Such effect is particularly significant in Embodiments 12~14 which adopt a combination of carbonate dimer or carboxylate dimer and sultone dimmer, since the formed complex SEI film has a stable structure and thus has good stability during cycling, and will not readily be decomposed and re-formed repeatedly during cycling.

The batteries of Embodiments 1~15 perform better than the batteries of Comparative examples 1~8 in capacity retention rate, rate performance, low-temperature discharge performance and safety performance after cycling at 45° C.

The lithium-ion battery will have further improved cycle performance if the additives further include the additive C, for example, the lithium-ion battery has relatively high capacity retention rate after a plurality of cycles at a voltage ≥4.45V, and further improved rate performance and low-temperature discharge performance.

Embodiments 16~22

Electrolytes and lithium-ion batteries are prepared according to the manner of Embodiment 1, except that the components of the additives in the electrolytes are shown in Table 4:

TABLE 4

| Electrolyte No. | Type and content (%) of additive | | | | | |
|---|---|---|---|---|---|---|
| | Additive A | | Additive B | | Additive C | |
| Electrolyte 16 | [structure] | 2% | $F(CF_2)_2OC_2H_2$ | 2% | FEC 1% + VC 1% | |
| Electrolyte 17 | [structure] | 2% | $F(CF_2)_4OC_2H_5$ | 2% | FEC 1% + PS 1% | |
| Electrolyte 18 | [structure] | 2% | $F(CF_2)_3OCH_3$ | 2% | ADN 1% + PS 1% + VC 1% | |
| Electrolyte 19 | [structure] | 2% | $F(CF_2)_9OCH_3$ | 2% | FEC 1% + ADN 1% + PS 1% | |
| Electrolyte 20 | [structure] | 2% | $CF_3CH_2OCH_3$ | 2% | ADN 1% + PS 1% + VC 1% | |
| Electrolyte 21 | [structure] | 2% | $CF_3CH_2OCHF_2$ | 2% | FEC 1% + ADN 1% + PS 1% | |
| Electrolyte 22 | [structure] | 2% | $(CF_3)_2CHCF_2OCH_3$ | 2% | FEC 1% + ADN 1% | |

The lithium-ion batteries are prepared by adopting the electrolytes in Table 4 and the prepared batteries have similar properties with Embodiment 1, which will not be repeated herein.

According to the disclosure above, those skilled in the art can make appropriate variations and modifications to the embodiments above. Thus, the present application is not limited to the embodiments as disclosed and descried above, and the variations and modifications made to the present application shall also fall into the protection scope of the claims of the present application.

What is claimed is:

1. A lithium-ion battery, comprising:
a positive electrode plate containing a positive electrode active material;
a negative electrode plate containing a negative electrode active material;
a separator for lithium battery; and
an electrolyte, comprising a lithium salt, an organic solvent and additives, the additives comprise additive A and additive B, wherein the additive A is selected from the group consisting of carbonate dimers, carboxylate dimers and combinations thereof, and the additive B is selected from the group consisting of fluoroethers and combinations thereof,
wherein the additives further comprise additive C comprising compounds containing a cyclic ester compound containing a sulfur-oxygen double bond shown as Formula V1;

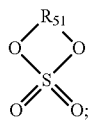

(V1)

$R_{51}$ is selected from the group consisting of substituted or unsubstituted $C_{1\ to\ 4}$ alkylenes and substituted or unsubstituted $C_{2\ to\ 4}$ alkenylenes, wherein each substituting group is selected from the group consisting of halogens and $C_{2\ to}$ 4 alkenyls, wherein the additive C further comprises compounds containing a carbon-nitrogen double bond and combinations thereof, wherein a total content of the additive A and the additive B is from 0.001% to 30% by weight of the electrolyte, a content of the additive C is from 0.01% to 10% by weight of the electrolyte, and a content of the compounds containing the carbon-nitrogen double bond is from 0.01% to 5% by weight of the electrolyte, and wherein a structural formula of the carbonate dimer is Formula I:

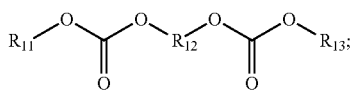

Formula I in Formula I, $R_{11}$ and $R_{13}$ are respectively selected from the group consisting of substituted or unsubstituted $C_{5\ to\ 22}$ heteroaryls, wherein each substituting group of the substituted $C_{5\ to\ 22}$ heteroaryls is selected from the group consisting of halogens, $C_{6\ to\ 26}$ aryls and $C_{3\ to\ 8}$ cyclic alkyls;

$R_{12}$ is selected from the group consisting of substituted or unsubstituted $C_{1\ to\ 12}$ alkylenes, substituted or unsubstituted $C_{6\ to\ 26}$ arylenes and radical groups composed of at least one ether bond and at least one substituted or unsubstituted $C_{1\ to\ 12}$ alkylene, wherein each substituting group is selected from the group consisting of halogens;

and a structural formula of the carboxylate dimer is Formula II:

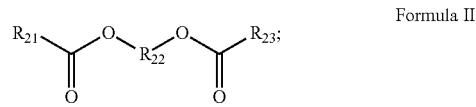

Formula II in Formula II, $R_{21}$ and $R_{23}$ are respectively selected from the group consisting of substituted or unsubstituted $C_{5\ to\ 22}$ heteroaryls, wherein each substituting group of the substituted $C_{5\ to\ 22}$ heteroaryls is selected from the group consisting of halogens, $C_{6\ to\ 26}$ aryls and $C_{3\ to\ 8}$ cyclic alkyls;

$R_{22}$ is selected from the group consisting of substituted or unsubstituted $C_{1\ to\ 12}$ alkylenes, substituted or unsubstituted $C_{6\ to\ 26}$ arylenes and radical groups composed of at least one ether bond and at least one substituted or unsubstituted $C_{1\ to\ 12}$ alkylene, wherein each substituting group is selected from the group consisting of halogens.

2. The lithium-ion battery according to claim 1, wherein a structural formula of the fluoroether compound is shown as Formula IV:

(IV)

in Formula IV, $R_{41}$ and $R_{42}$ are respectively selected from the group consisting of $C_{1\ to\ 20}$ alkyls and $C_{1\ to\ 20}$ fluoroalkyls; at least one of $R_{41}$ and $R_{42}$ is a $C_{1\ to\ 20}$ fluoroalkyl; and the fluoroalkyl is an alkyl of which all or partial hydrogen atoms are substituted by fluorine;

$R_{41}$ and $R_{42}$ are preferably selected from the group consisting of $C_{1\ to\ 9}$ alkyls and $C_{1\ to\ 9}$ fluoroalkyls, respectively.

3. The lithium-ion battery according to claim 2, wherein the fluoroether compound is selected from the group consisting of $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$ and combinations thereof.

4. The lithium-ion battery according to claim 1, wherein the compound containing a carbon-nitrogen double bond is selected from the group consisting of compounds containing

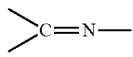

and —N=C=N— and combinations thereof.

5. The lithium-ion battery according to claim 4, wherein the additive C is selected from the group consisting of 1,2-ethylene sulfate, 1,3-propylene sulfate, and combinations thereof, and selected from the group consisting of N-pentyl-isopropyl-imide, and dicyclohexylcarbodiimide, and combinations thereof.

6. The lithium-ion battery according to claim 4, wherein a content of the compounds containing a carbon-nitrogen double bond is from 0.1% to 3% by weight of the electrolyte.

* * * * *